US012710904B2

(12) United States Patent
Sekine

(10) Patent No.: US 12,710,904 B2
(45) Date of Patent: Aug. 18, 2026

(54) INFORMATION PROCESSING APPARATUS THAT EXTRACTS AND OUTPUTS AN OPERATOR CORRESPONDING TO ACQUIRED PRESET INFORMATION, INFORMATION PROCESSING SYSTEM, AND INFORMATION PROCESSING PROGRAM

(71) Applicant: FUJIFILM CORPORATION, Tokyo (JP)

(72) Inventor: Yoshihiro Sekine, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 33 days.

(21) Appl. No.: 18/567,361

(22) PCT Filed: Jul. 4, 2022

(86) PCT No.: PCT/JP2022/026643

§ 371 (c)(1),
(2) Date: Dec. 6, 2023

(87) PCT Pub. No.: WO2023/008107

PCT Pub. Date: Feb. 2, 2023

(65) Prior Publication Data

US 2025/0094102 A1 Mar. 20, 2025

(30) Foreign Application Priority Data

Jul. 29, 2021 (JP) ................................ 2021-124757

(51) Int. Cl.
*H04N 1/04* (2006.01)
*G06F 3/12* (2006.01)

(52) U.S. Cl.
CPC .......... *G06F 3/1238* (2013.01); *G06F 3/1221* (2013.01); *G06F 3/1222* (2013.01); *G06F 3/1236* (2013.01); *G06F 3/1292* (2013.01)

(58) Field of Classification Search
None
See application file for complete search history.

(56) References Cited

U.S. PATENT DOCUMENTS

2010/0069008 A1 3/2010 Oshima et al.
2014/0019499 A1 1/2014 Arai
(Continued)

FOREIGN PATENT DOCUMENTS

JP 2008-200898 A 9/2008
JP 2010-098717 A 4/2010
(Continued)

OTHER PUBLICATIONS

English language translation of the following: Office action dated Aug. 5, 2025 from the JPO in a Japanese patent application No. 2021-124757 corresponding to the instant patent application. This office action translation is submitted now in order to supplement the understanding of the cited references which are being disclosed in the instant Information Disclosure Statement.

*Primary Examiner* — Cheukfan Lee
(74) *Attorney, Agent, or Firm* — SOLARIS Intellectual Property Group, PLLC

(57) ABSTRACT

An information processing apparatus includes a processor configured to acquire preset information and to extract and output, from among plural operators associated with settings of executed jobs, an operator corresponding to the information. The apparatus makes searching for a desired operator easier than when searching for the desired operator from among all operators.

9 Claims, 14 Drawing Sheets

(56) References Cited

U.S. PATENT DOCUMENTS

| | | | | |
|---|---|---|---|---|
| 2014/0300920 | A1 | 10/2014 | Hayashi | |
| 2017/0269880 | A1 | 9/2017 | Hayashi | |
| 2019/0220237 | A1* | 7/2019 | Maeda | G06F 3/1253 |
| 2020/0137296 | A1 | 4/2020 | Okada | |

FOREIGN PATENT DOCUMENTS

| | | | |
|---|---|---|---|
| JP | 2014-238798 | A | 12/2014 |
| JP | 2015-122601 | A | 7/2015 |
| JP | 2018-152870 | A | 9/2018 |
| JP | 2020-071607 | A | 5/2020 |
| JP | 2020-178215 | A | 10/2020 |
| JP | 2021-103865 | A | 7/2021 |

* cited by examiner

INFORMATION PROCESSING APPARATUS THAT EXTRACTS AND OUTPUTS AN OPERATOR CORRESPONDING TO ACQUIRED PRESET INFORMATION, INFORMATION PROCESSING SYSTEM, AND INFORMATION PROCESSING PROGRAM

TECHNICAL FIELD

The present disclosure relates to an information processing apparatus, an information processing system, and an information processing program.

BACKGROUND ART

JP-A No. 2015-122601 proposes an image forming apparatus that stores, in association with user information, setting information defining settings of a process executed by the image forming apparatus, detects a portable storage medium, acquires user information by detecting the portable storage medium, acquires setting information relating to a process executed by the image forming apparatus, and stores the acquired setting information in association with the acquired user information.

JP-A No. 2008-200898 proposes an image forming apparatus including: registration means for registering a user ID representing an owner of an external terminal; user ID receiving means for receiving the user ID by short-range communication from the external terminal; searching means for searching, from user IDs registered in the registration means, for a user ID matching the user ID received by the user ID receiving means; and user authentication means for establishing user authentication with the external terminal when a matching user ID is found by the searching means.

JP-A No. 2010-98717 proposes a mobile terminal device which, in response to a setting item request requesting a setting item relating to information processing in an information processing apparatus, receives the setting item from the information processing apparatus by short-range communication means and displays a setting screen that selectably displays a value for the received setting item, whereby the presentation and setting of the setting item usable by the information processing apparatus connected by wireless communication is performed by the mobile terminal device.

SUMMARY OF INVENTION

Technical Problem

There is a function of displaying operators associated with settings of executed jobs and applying the settings executed in the past by means of the operation of the operators to enable quick re-execution of the jobs. However, when reused functions increase or when the number of users increases, the number of operators inevitably ends up increasing, and a desired operator ends up becoming difficult to search for.

Thus, it is an object of the present disclosure to provide an information processing apparatus, an information processing system, and an information processing program with which it is easier to search for a desired operator than it is when searching for the desired operator from among all operators.

Solution to Problem

In order to achieve the above object, an information processing apparatus pertaining to a first aspect includes a processor, the processor performing a process to: acquire preset information; and extract, from among plural operators associated with settings of executed jobs, and output an operator corresponding to the information.

Furthermore, an information processing apparatus pertaining to a second aspect is the information processing apparatus pertaining to the first aspect, wherein the processor acquires, as the preset information, at least one of user information and a type of job that a user will use and extracts and outputs the operator corresponding to the at least one.

Furthermore, an information processing apparatus pertaining to a third aspect is the information processing apparatus pertaining to the first aspect or the second aspect, wherein the processor further performs a process to acquire the preset information from a terminal device with which it has established short-range wireless communication and grant operational priority of a host device to the mobile device from which it has acquired the preset information.

Furthermore, an information processing apparatus pertaining to a fourth aspect is the information processing apparatus pertaining to any one of the first aspect to the third aspect, wherein when extracting the operator, the processor extracts the operator after excluding unusable operators.

Furthermore, an information processing apparatus pertaining to a fifth aspect is the information processing apparatus pertaining to the fourth aspect, wherein the unusable operators are operators corresponding to at least one of a failure and an access restriction.

Furthermore, an information processing apparatus pertaining to a sixth aspect is the information processing apparatus pertaining to the first aspect or the second aspect, wherein the processor acquires plural operators registered in an execution apparatus that executes the job and extracts the operator corresponding to the information.

Furthermore, an information processing apparatus pertaining to a seventh aspect is the information processing apparatus pertaining to the sixth aspect, wherein when the execution apparatus is in a power saving mode, the processor acquires the plural operators registered in the execution apparatus after instructing cancellation of the power saving mode.

Furthermore, an information processing system pertaining to an eighth aspect includes: the information processing apparatus pertaining to any one of the first aspect to the fifth aspect; and a mobile terminal device that sends the information to the information processing apparatus and displays the operator that has been output from the information processing apparatus.

Furthermore, an information processing system pertaining to a ninth aspect includes: the information processing apparatus pertaining to the sixth aspect or the seventh aspect; and an execution apparatus that sends plural preregistered operators to the information processing apparatus.

Furthermore, an information processing program pertaining to a tenth aspect causes a computer to execute a process to: acquire preset information; and extract, from among plural operators associated with settings of executed jobs, and output an operator corresponding to the information.

Advantageous Effects of Invention

According to the first aspect, there can be provided an information processing apparatus with which it is easier to search for a desired operator than it is when searching for the desired operator from among all operators.

According to the second aspect, it becomes possible to narrow down options when selecting the desired operator.

According to the third aspect, it becomes possible to inhibit interrupting jobs.

According to the fourth aspect, it becomes possible to prevent execution of a job using an unusable operator.

According to the fifth aspect, it becomes possible to prevent execution of a job using an operator that is unusable due to a failure or an access restriction.

According to the sixth aspect, it becomes possible to extract an operator registered in an execution apparatus.

According to the seventh aspect, even when the execution apparatus is in a power saving mode, it becomes possible to cancel the power saving mode and extract the operator.

According to the eighth aspect, there can be provided an information processing system with which it is easier to search for a desired operator than it is when searching for the desired operator from among all operators.

According to the ninth aspect, there can be provided an information processing system with which it is easier to search for a desired operator than it is when searching for the desired operator from among all operators.

According to the tenth aspect, there can be provided an information processing program with which it is easier to search for a desired operator than it is when searching for the desired operator from among all operators.

DESCRIPTION OF EMBODIMENTS

First Embodiment

Figure 1:
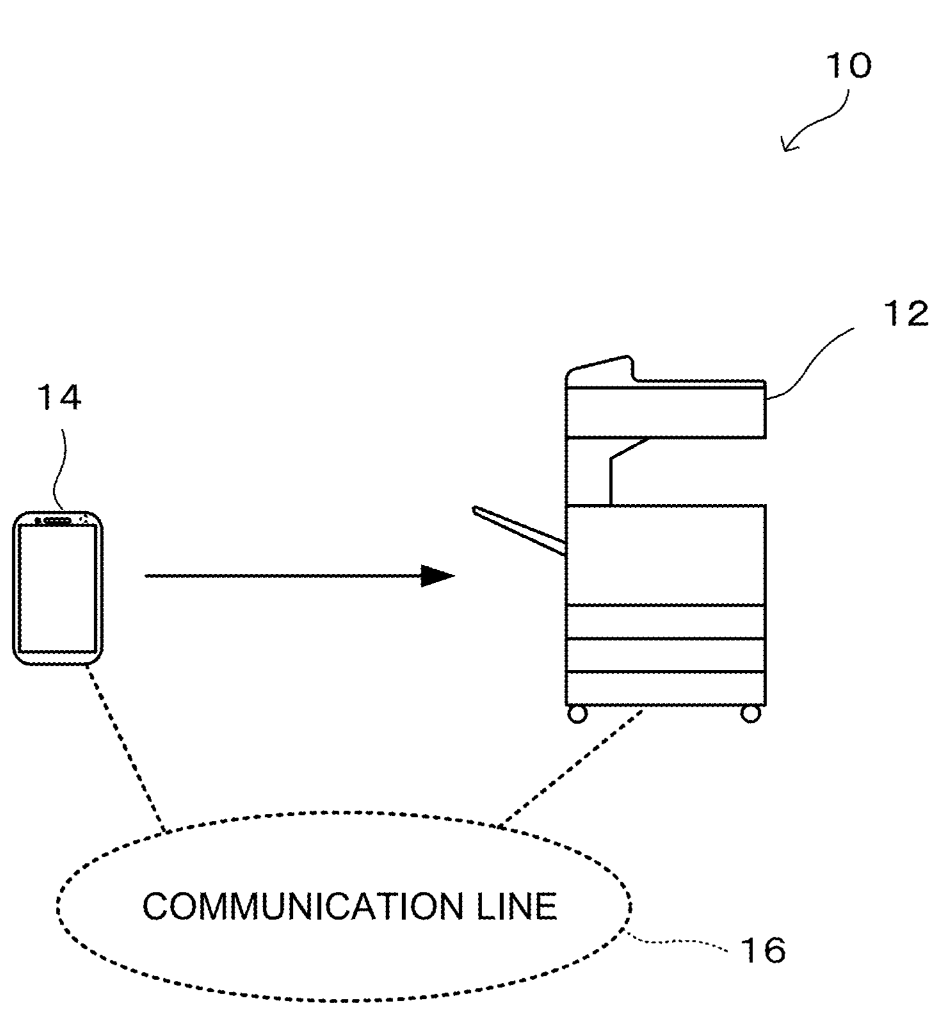
FIG. 1 is a diagram showing the schematic configuration of an information processing system pertaining to embodiments.

An example of an embodiment of the present disclosure will be described in detail below with reference to the drawings. FIG. 1 is a diagram showing the schematic configuration of an information processing system pertaining to the present embodiment.

An information processing system 10 pertaining to the present embodiment is configured to include an image forming apparatus 12 serving as an example of an information processing apparatus and a mobile terminal device 14.

The mobile terminal device 14 is communicable with the image forming apparatus 12 by short-range wireless communication, and the image forming apparatus 12 is operable from the mobile terminal device 14. For example, as the mobile terminal device 14, a tablet terminal or a smartphone may be applied as an example. Furthermore, as the short-range wireless communication, Wi-Fi (registered trademark) or Bluetooth (registered trademark) may be applied as an example.

As the image forming apparatus 12, an image forming apparatus having multiple functions, such as a facsimile function, an image reading function, an image forming function, a copy function, a storage function for storing image information and the like, and a send function for sending image information and the like, may be applied as an example. Furthermore, although FIG. 1 shows one image forming apparatus 12, the number of the image forming apparatus 12 is not limited to one and may be two or more. Furthermore, although FIG. 1 also shows one mobile terminal device 14, the number of the mobile terminal devices 14 is not limited to one and may be two or more, and mobile terminal devices owned by various users can be applied. It will be noted that, below, sometimes the facsimile function is called faxing, the image reading function is called scanning, the image forming function is called printing, and the copy function is called copying.

Furthermore, although the communication between the mobile terminal device 14 and the image forming apparatus 12 is described as short-range wireless communication, the mobile terminal device 14 and the image forming apparatus 12 may also communicate with each other via a communication line 16 of a wireless base station of a mobile telephone network or the like or various types of networks (e.g., LAN, WAN, Ethernet (registered trademark)) as indicated by the dashed lines in FIG. 1.

Figure 2:
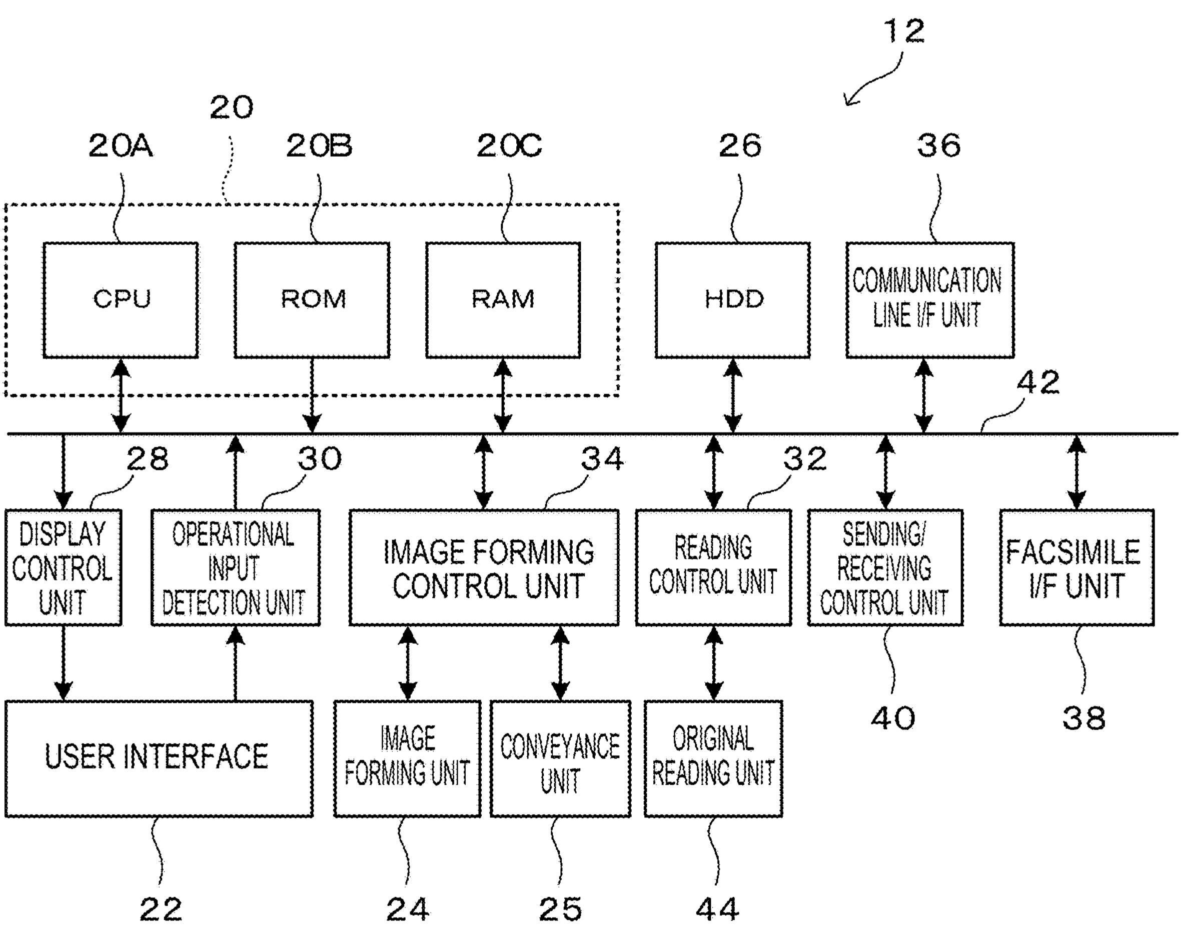
FIG. 2 is a block diagram showing main configurations of an electrical system of an image forming apparatus in the information processing system pertaining to the embodiments.

FIG. 2 is a block diagram showing main configurations of an electrical system of the image forming apparatus 12 in the information processing system 10 pertaining to the present embodiment.

As shown in FIG. 2, the image forming apparatus 12 pertaining to the present embodiment includes a control unit 20 including a central processing unit (CPU) 20A serving as an example of a processor, a read-only memory (ROM) 20B, and a random-access memory (RAM) 20C. The CPU 20A controls the operations of the entire image forming apparatus 12. The RAM 20C is used as a workspace or the like when the CPU 20A executes various types of programs. In the ROM 20B, various types of control programs and various types of parameters are prestored. Additionally, in the image forming apparatus 12, the parts of the control unit 20 are electrically interconnected by a system bus 42.

Furthermore, the image forming apparatus 12 pertaining to the present embodiment includes a hard disk drive (HDD) 26 that stores various types of data and application programs. Furthermore, the image forming apparatus 12 includes a display control unit 28 that is connected to a user interface 22 and controls the display of various types of operation screens and the like on a display of the user interface 22. Furthermore, the image forming apparatus 12 includes an operational input detection unit 30 that is connected to the user interface 22 and detects operational instructions input via the user interface 22. Additionally, in the image forming apparatus 12, the HDD 26, the display control unit 28, and the operational input detection unit 30 are electrically connected to the system bus 42. It will be noted that although the HDD 26 is applied as a storage unit in the image forming apparatus 12 pertaining to the present embodiment, the storage unit is not limited thereto, and a nonvolatile storage unit such as flash memory may also be applied.

Furthermore, the image forming apparatus 12 pertaining to the present embodiment includes a reading control unit 32, which controls optical image reading operations by an original reading unit 44 and original feeding operations by an original conveyance unit, and an image forming control unit 34, which controls image forming processes by an image forming unit 24 and paper sheet conveyance to the image forming unit 24 by a conveyance unit 25. Furthermore, the image forming apparatus 12 includes a communication line interface (I/F) unit 36 for sending communication data to and receiving communication data from other external devices connected to the communication line 16 of various types of networks and sending and receiving communication data by short-range wireless communication with the mobile terminal device 14. Furthermore, the image forming apparatus 12 includes a facsimile interface (I/F) unit 38 that is connected to a telephone line (not shown in the drawings) and is for sending facsimile data to and receiving facsimile data from facsimile machines connected to the telephone line. Furthermore, the image forming apparatus 12 includes a sending/receiving control unit 40 that controls the sending and receiving of facsimile data via the facsimile I/F unit 38. Additionally, in the image forming apparatus 12, the sending/receiving control unit 40, the reading control unit 32, the image forming control unit 34, the communication line I/F unit 36, and the facsimile I/F unit 38 are electrically connected to the system bus 42.

Because of the above configurations, the image forming apparatus 12 pertaining to the present embodiment uses the CPU 20A to execute access to each of the RAM 20C, the ROM 20B, and the HDD 26. Furthermore, the image forming apparatus 12 uses the CPU 20A to execute control of the display of operation screens and information such as various types of messages on the display of the user interface 22 via the display control unit 28. Furthermore, the image forming apparatus 12 uses the CPU 20A to execute control of the actuation of the original reading unit 44 and the original conveyance unit via the reading control unit 32. Furthermore, the image forming apparatus 12 uses the CPU 20A to execute control of the actuation of the image forming unit 24 and the conveyance unit 25 via the image forming control unit 34 and control of the sending and receiving of communication data via the communication line I/F unit 36. Furthermore, the image forming apparatus 12 uses the CPU 20A to execute control of the sending and receiving of facsimile data via the facsimile I/F unit 38 by the sending/receiving control unit 40. Moreover, the image forming apparatus 12 uses the CPU 20A to grasp operational content in the user interface 22 based on operational information detected by the operational input detection unit 30 and execute various types of control based on the operational content.

Furthermore, the image forming apparatus 12 pertaining to the present embodiment has the function of performing what is called pinning and re-executing a function by applying an operator in a case where, when executing a function such as copying, faxing, emailing, or scanning or when executing a combination of these functions, the function is executed after its setting information has been changed from setting defaults. It will be noted that the operator corresponds to a pin for pinning and is associated with the setting information.

Figure 3:
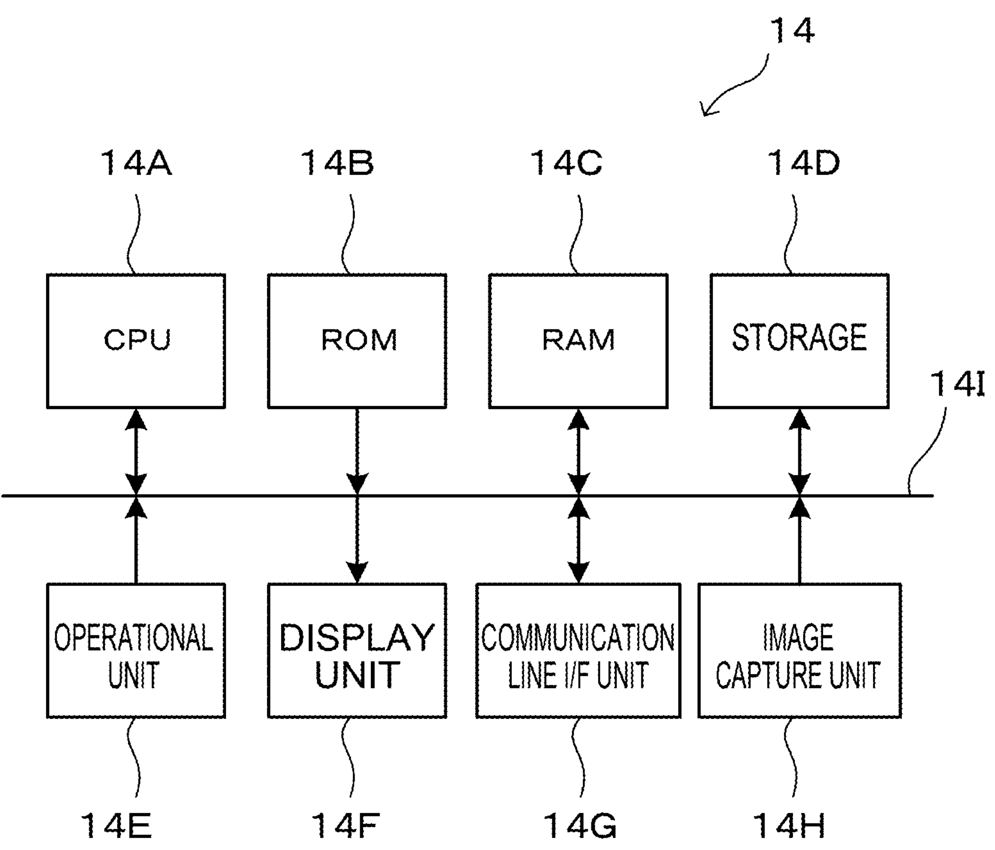
FIG. 3 is a block diagram showing main configurations of an electrical system of a mobile terminal device in the information processing system pertaining to the embodiments.

Next, main configurations of an electrical system of the mobile terminal device 14 pertaining to the present embodiment will be described. FIG. 3 is a block diagram showing main configurations of the electrical system of the mobile terminal device 14 in the information processing system 10 pertaining to the present embodiment.

As shown in FIG. 3, the mobile terminal device 14 pertaining to the present embodiment includes a CPU 14A, a ROM 14B, a RAM 14C, a storage 14D, an operational unit 14E, a display unit 14F, a communication line interface (I/F) unit 14G, and an image capture unit 14H. The CPU 14A controls the operations of the entire mobile terminal device 14. In the ROM 14B, various types of control programs and various types of parameters are prestored. The RAM 14C is used as a workspace or the like when the CPU 14A executes various types of programs. In the storage 14D, various types of data and application programs are stored. The operational unit 14E is used for inputting various types of information. The display unit 14F is used for displaying various types of information. The image capture unit 14H outputs image information obtained by image capture. The communication line I/F unit 14G sends various types of data to and receives various types of data from other devices connected to a communication line of various types of networks. Furthermore, the communication line I/F unit 14G sends various types of data to and receives various types of data from the image forming apparatus 12 using wireless communication such as various types of known short-range wireless communication. The above parts of the mobile terminal device 14 are electrically connected to each other by a system bus 14I. It will be noted that although the storage 14D is applied as a storage unit in the mobile terminal device 14 pertaining to the present embodiment, as the storage 14D various types of nonvolatile storage units such as a hard disk drive (HDD) or flash memory may be applied as an example.

Because of the above configurations, the mobile terminal device 14 pertaining to the present embodiment uses the CPU 14A to execute access to each of the ROM 14B, the RAM 14C, and the storage 14D, acquisition of various types of data via the operational unit 14E, image capture by the image capture unit 14H, and display of various types of information with respect to the display unit 14F. Furthermore, the mobile terminal device 14 uses the CPU 14A to execute control of the sending and receiving of communication data via the communication line I/F unit 14G.

Figure 4:
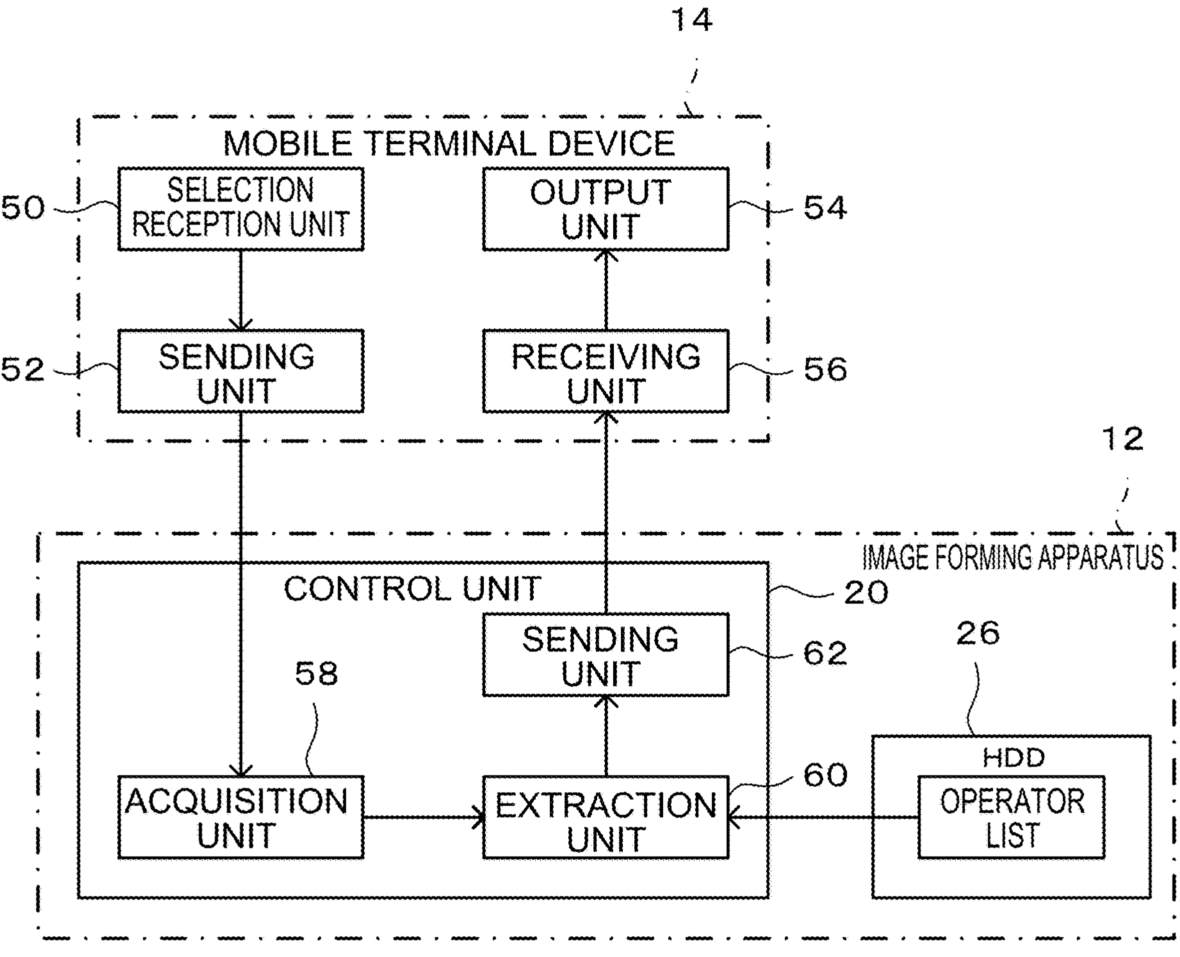
FIG. 4 is a functional block diagram showing functional configurations of the mobile terminal device and a control unit of the image forming apparatus pertaining to the embodiments.

Next, functional configurations of the mobile terminal device 14 and the control unit 20 of the image forming apparatus 12 will be described. FIG. 4 is a functional block diagram showing functional configurations of the mobile terminal device 14 and the control unit 20 of the image forming apparatus 12 pertaining to the present embodiment.

The mobile terminal device 14 has the functions of a selection reception unit 50, a sending unit 52, a receiving unit 56, and an output unit 54 as a result of the CPU 14A executing programs stored in the ROM 14B.

Figure 5:
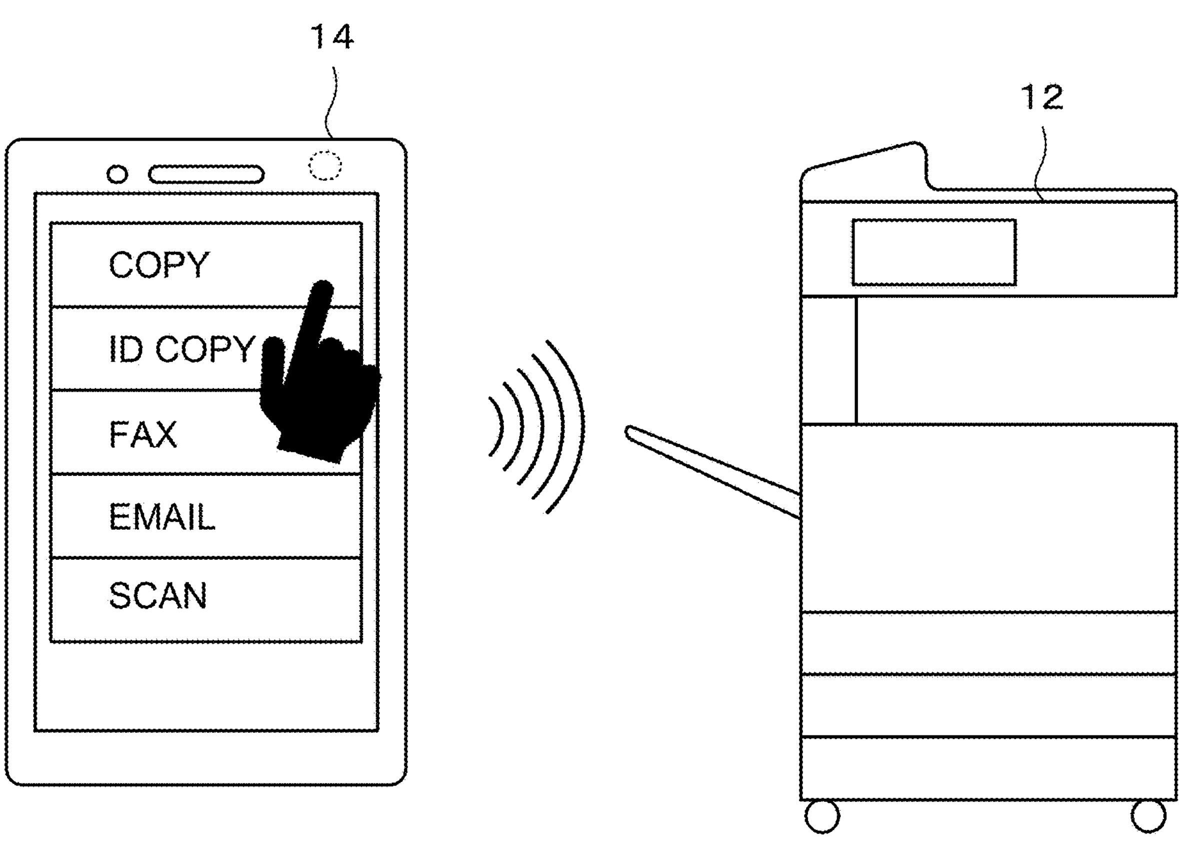
FIG. 5 is a diagram showing the selection result of a type of service that a user will use being sent from the mobile terminal device to the image forming apparatus.

The selection reception unit 50 receives a selection of a type of service that a user will use from the multiple functions of the image forming apparatus 12, such as copying, faxing, scanning, and printing. For example, as shown in FIG. 5, the selection reception unit 50 displays on the display unit 14F a selection screen for selecting a service to use and receives the selection result.

The sending unit 52 sends to the image forming apparatus 12 the selection result received by the selection reception unit 50. For example, as shown in FIG. 5, the sending unit 52 sends, by short-range wireless communication to the image forming apparatus 12, the selection result received by the selection reception unit 50. FIG. 5 shows an example where the user selects "Copy" and the sending unit 52 sends that selection result.

Figure 6:
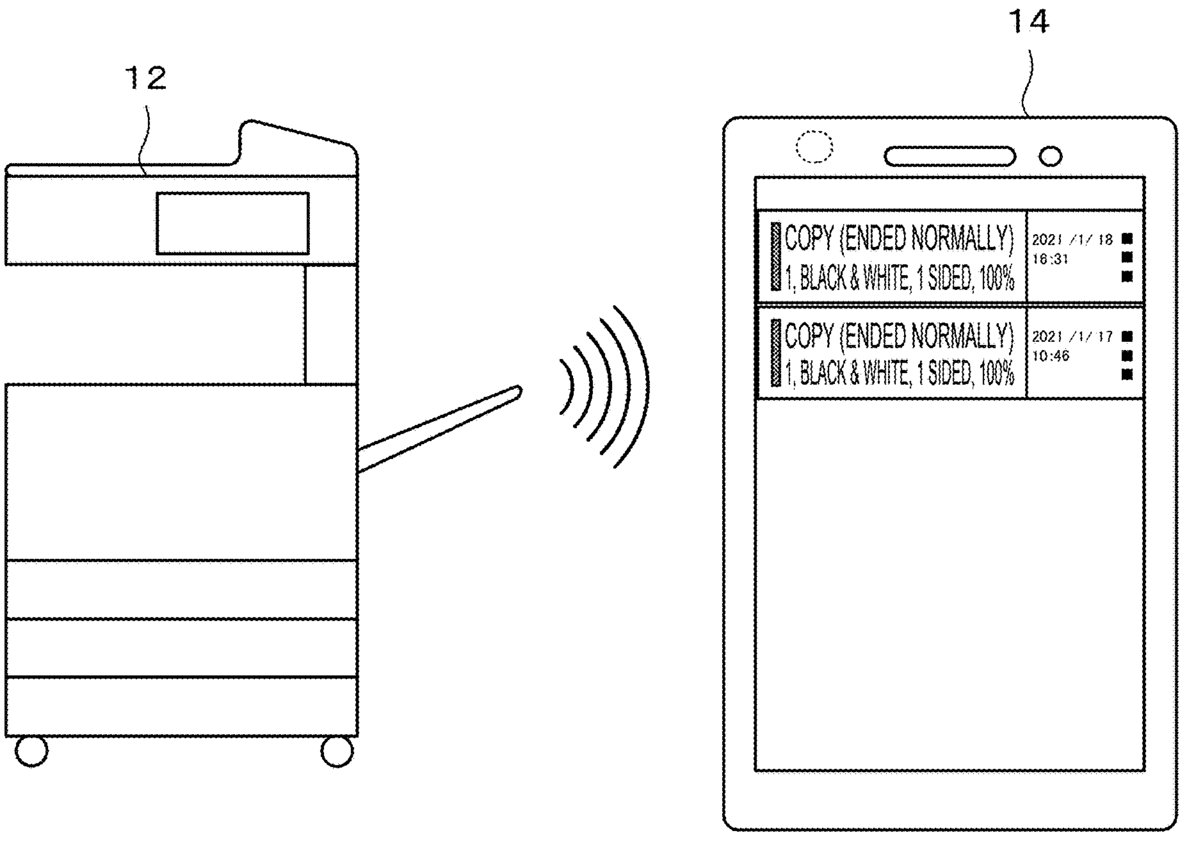
FIG. 6 is a diagram showing the mobile terminal device receiving from the image forming apparatus and displaying an operator list.

The receiving unit 56 receives an operator list extracted by the image forming apparatus 12 and sent from a sending unit 62. For example, as shown in FIG. 6, the receiving unit 56 receives the operator list by short-range wireless communication.

The output unit 54 outputs the operator list received by the receiving unit 56 by displaying the operator list on the display unit 14F. For example, the output unit 54 displays the operator list as shown in FIG. 6. FIG. 6 shows an example where two operators are displayed as the operator list.

Meanwhile, the control unit 20 has the functions of an acquisition unit 58, an extraction unit 60, and a sending unit 62 as a result of the CPU 20A executing programs stored in the ROM 20B.

The acquisition unit 58 acquires, as preset information, the selection result of the service that the user will use which was sent from the sending unit 52 of the mobile terminal device 14. For example, as shown in FIG. 5, the acquisition unit 58 acquires the selection result of the service that the user will use by receiving the information sent from the sending unit 52 by short-range wireless communication.

The extraction unit 60 extracts, from among operator lists prestored in the HDD 26, an operator list corresponding to the service that the user will use. It will be noted that an "operator list" is a list of operators associated with setting information relating to executed jobs. The HDD 26 stores, as the operator lists, executed jobs including setting information by applying operators to the executed jobs. Here, "job" refers to a process or a collection of processes that the image forming apparatus 12 executes in order to realize a predetermined function.

The sending unit 62 sends to the mobile terminal device 14 the operator list extracted by the extraction unit 60. For example, the sending unit 62 sends the operator list by short-range wireless communication as shown in FIG. 6.

That is, in the information processing system 10 pertaining to the present embodiment, when the user approaches the image forming apparatus 12, the user starts a smartphone app and selects in advance a service to use from copying, faxing, scanning, printing, and the like, whereby the selection unit 50 receives the selection result. Then, the sending unit 52 sends the reception result of the selection reception unit 50 to the image forming apparatus 12.

Figure 7:
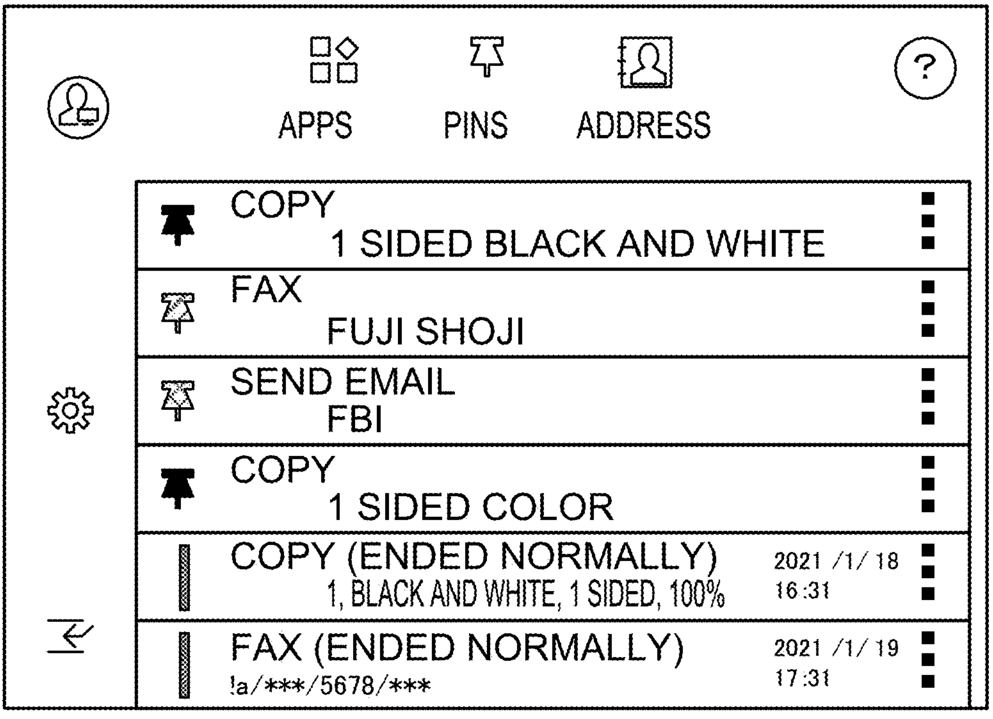
FIG. 7 is a diagram showing an example where a list including plural operators and a job history is displayed.
Figure 8:
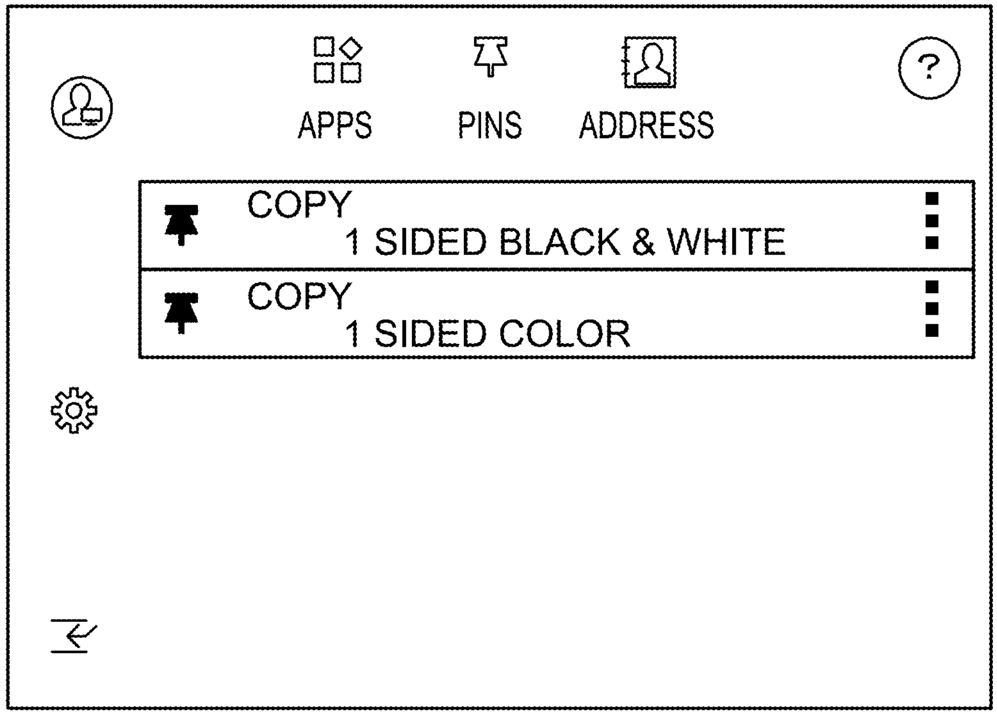
FIG. 8 shows an example where a copy service is filtered from the operator list of FIG. 7.

Because of this, in the image forming apparatus 12, the acquisition unit 58 acquires the selection result of the service that the user will use, the extraction unit 60 filters the operator list corresponding to the service that the user will use, and the sending unit 62 sends the filtered operator list to the mobile terminal device 14. Because of this, a job is executed by the user selecting the desired operator and sending an execution instruction to the image forming apparatus 12. Consequently, when selecting a desired operator, there are fewer operators from which to select when selecting the desired operator from an operator list that includes only the service that the user will use as shown in FIG. 8 than when selecting the desired operator from an operator list that includes operators of plural services as shown in FIG. 7. FIG. 8 shows an example where the copy service is filtered from the operator list in FIG. 7.

Next, specific processes performed by each part of the information processing system 10 pertaining to the present embodiment configured as described above will be described.

Figure 9:
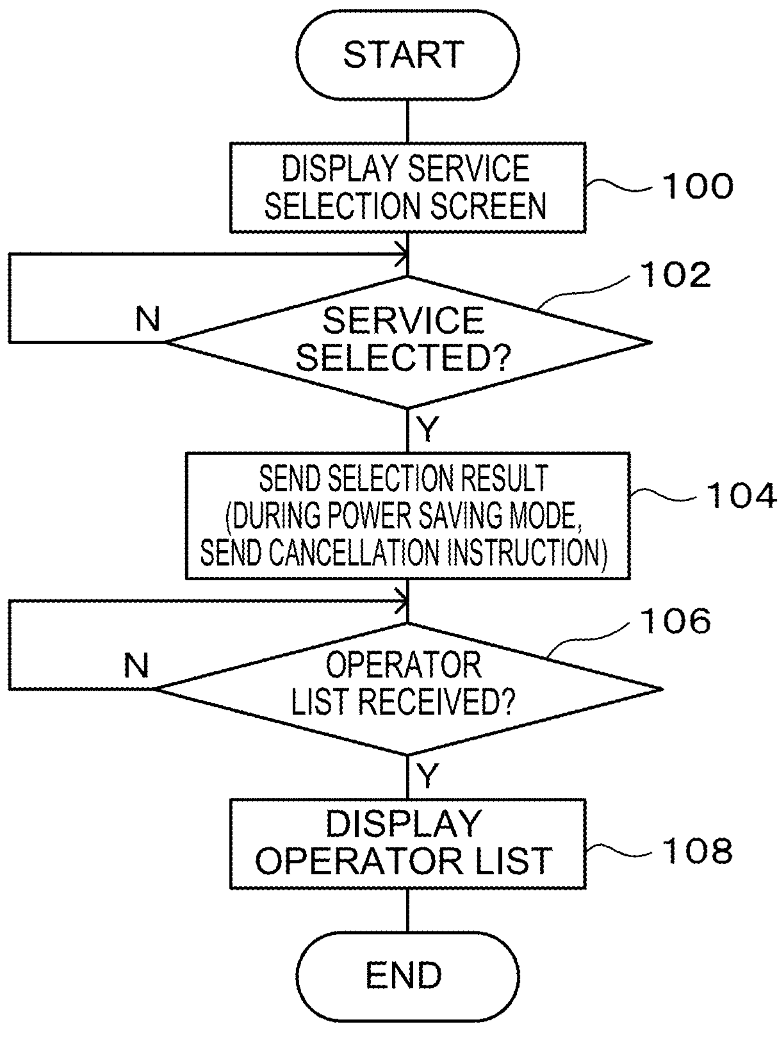
FIG. 9 is a flowchart showing an example of a flow of processes performed by the mobile terminal device when selecting an operator to execute a job in the information processing system pertaining to a first embodiment.

First, specific processes performed by the mobile terminal device 14 when selecting an operator to execute a job will be described. FIG. 9 is a flowchart showing an example of a flow of processes performed by the mobile terminal device 14 when selecting an operator to execute a job in the information processing system 10 pertaining to the present embodiment. It will be noted that the processes in FIG. 9 start when the application is started.

In step 100 the CPU 14A displays a predetermined service selection screen on the display unit 14F, then moves to step 102. For example, as shown in FIG. 5, the CPU 14A displays a screen for selecting a service to use.

In step 102 the CPU 14A determines whether or not a service has been selected. The CPU 14A makes this determination by determining whether or not the selection reception unit 50 has received the selection of a service that the user will use. The CPU 14A stands by until the determination is YES, then moves to step 104. It will be noted that when a cancel operation or the like is performed while the CPU 14A is standing by, the CPU 14A ends the process and executes another instructed process.

In step 104 the CPU 14A sends the selection result to the image forming apparatus 12, then moves to step 106. That is, the sending unit 52 sends, by short-range wireless communication to the image forming apparatus 12, the selection result received by the selection reception unit 50. It will be noted that, here, when the image forming apparatus 12 is in a power saving mode, the CPU 14A sends the selection result after causing the image forming apparatus 12 to exit the power saving mode by sending a power saving mode cancellation instruction such as a power saving mode cancellation command.

In step 106 the CPU 14A determines whether or not it has received the operator list from the image forming apparatus 12. The CPU 14A makes this determination by determining whether or not the receiving unit 56 has received the operator list extracted by the image forming apparatus 12 and sent by the sending unit 62. The CPU 14A stands by until the determination is YES, then moves to step 108. It will be noted that when a cancel operation or the like is performed while the CPU 14A is standing by, the CPU 14A ends the process and executes another instructed process.

In step 108 the CPU 14A displays on the display unit 14F the operator list received from the image forming apparatus 12, then ends the series of processes. That is, the output unit 54 outputs the operator list by displaying on the display unit 14F the operator list received by the receiving unit 56.

Figure 10:
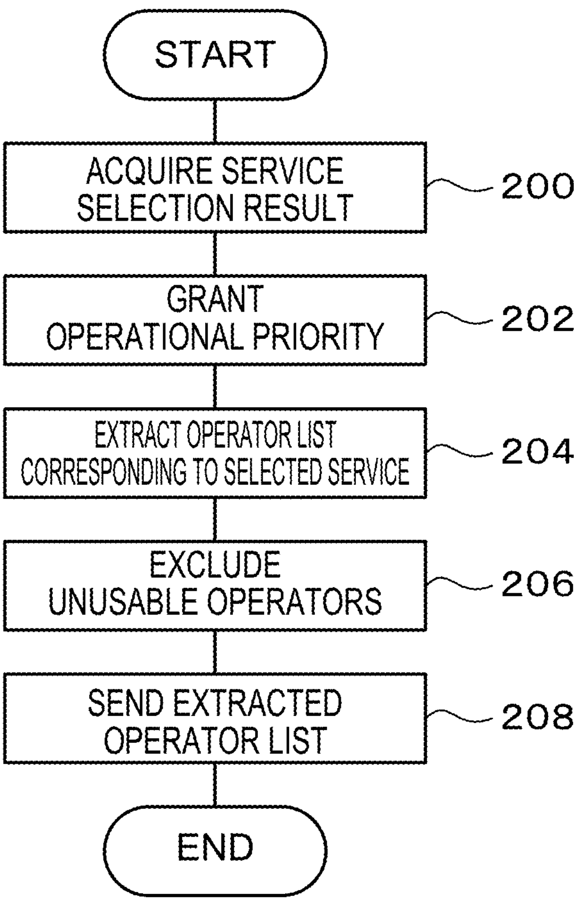
FIG. 10 is a flowchart showing an example of a flow of processes performed by the image forming apparatus when a service selection result is sent from the mobile terminal device in the information processing system pertaining to the first embodiment.

Next, processes performed by the image forming apparatus 12 when the service selection result is sent from the mobile terminal device 14 will be described. FIG. 10 is a flowchart showing an example of a flow of processes performed by the image forming apparatus 12 when the service selection result is sent from the mobile terminal device 14 in the information processing system 10 pertaining to the present embodiment. It will be noted that the processes in FIG. 10 start when short-range wireless communication with the mobile terminal device 14 is established and the service selection result is sent from the mobile terminal device 14.

In step 200 the CPU 20A acquires the service selection result, then moves to step 202. That is, the acquisition unit 58 acquires the selection result of the service that the user will use which was sent from the sending unit 52 of the mobile terminal device 14.

In step 202 the CPU 20A grants operational priority to the mobile terminal device 14 with which short-range wireless communication has been established, then moves to step 204. For example, the CPU 20A locks the screen of the user interface 22 in order to prohibit use of the image forming apparatus 12 by another user. It will be noted that step 202 may also be omitted.

In step 204 the CPU 20A extracts the operator list corresponding to the selected service, then moves to step 206. That is, the extraction unit 60 extracts, from among the operator lists prestored in the HDD 26, the operator list corresponding to the service that the user will use.

In step 206 the CPU 20A excludes unusable operators from the extracted operator list, then moves to step 208. For example, the extraction unit 60 excludes operators that are unusable due to reasons such as at least one of a difference in the settings of the image forming apparatus 12, a failure, and an access restriction. Because of this, only usable operators are extracted. It will be noted that step 206 may also be omitted.

In step 208 the CPU 20A sends the extracted operator list to the mobile terminal device 14, then ends the series of processes. That is, the sending unit 62 sends to the mobile terminal device 14 the operator list extracted by the extraction unit 60. Because of this, in the mobile terminal device 14, an operator list including only operators of the service to be used is displayed. Furthermore, because the CPU 20A extracts and sends the operators, the sending and receiving amount is decreased, and display and activation are faster. Furthermore, the process is hygienic because the job is executed without the user touching the user interface 22 and the like of the image forming apparatus 12 that a large number of unspecified people touch.

Second Embodiment

Next, an information processing system pertaining to a second embodiment will be described. In the first embodiment, when extracting the operator list, the extraction unit 60 extracts an operator list corresponding to the service that the user will use, but the present embodiment differs in that the extraction unit 60 extracts services that the user has used. That is, basic configurations are identical to those of the first embodiment, so description of configurations will be omitted.

In the present embodiment, the acquisition unit 58 acquires user information as the preset information, and the extraction unit 60 extracts operators corresponding to the user information. Because of this, the extraction unit 60 searches for the desired operator from an operator list including only operators that the user has registered rather than searching for the desired operator from operator lists that all users have registered, so it is easier to search for the desired operator.

Figure 11:
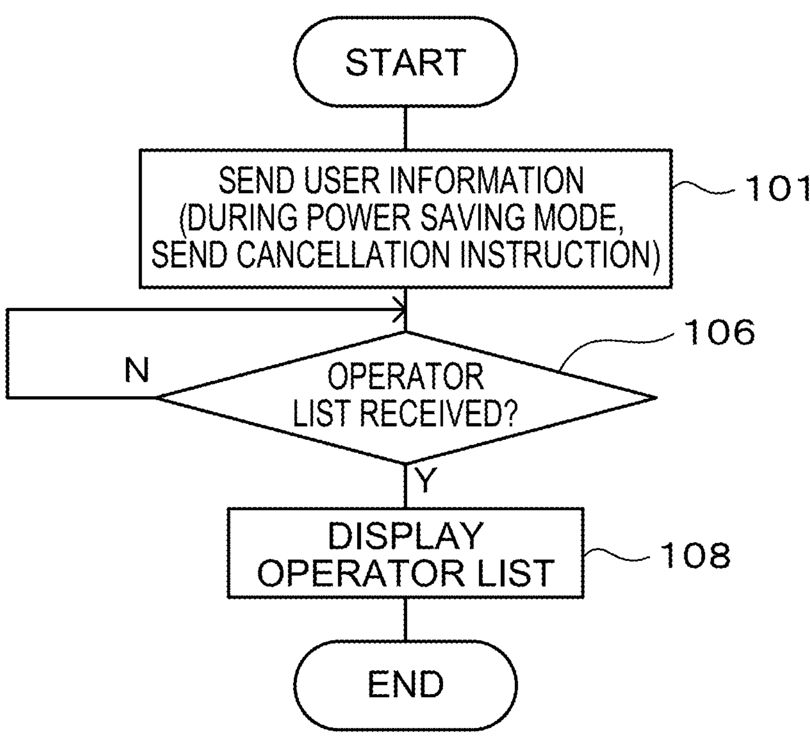
FIG. 11 is a flowchart showing an example of a flow of processes performed by the mobile terminal device when selecting an operator to execute a job in the information processing system pertaining to a second embodiment.

Here, specific processes performed by the mobile terminal device 14 when selecting an operator to execute a job in the information processing system 10 pertaining to the present embodiment will be described. FIG. 11 is a flowchart showing an example of a flow of processes performed by the mobile terminal device 14 when selecting an operator to execute a job in the information processing system 10 pertaining to the present embodiment. It will be noted that the processes in FIG. 11 start when the application is started. Furthermore, processes identical to processes in FIG. 9 are assigned identical reference signs and described.

In step 101 the CPU 14A sends the user information, then moves to step 106. For example, the sending unit 52 sends user identification information such as a user ID preregistered in the application.

In step 106 the CPU 14A determines whether or not it has received the operator list from the image forming apparatus 12. The CPU 14A makes this determination by determining whether or not the receiving unit 56 has received the operator list extracted by the image forming apparatus 12 and sent by the sending unit 62. The CPU 14A stands by until the determination is YES, then moves to step 108. It will be noted that when a cancel operation or the like is performed while the CPU 14A is standing by, the CPU 14A ends the process and executes another instructed process.

In step 108 the CPU 14A displays on the display unit 14F the operator list received from the image forming apparatus 12, then ends the series of processes. That is, the output unit 54 outputs the operator list by displaying on the display unit 14F the operator list received by the receiving unit 56.

Figure 12:
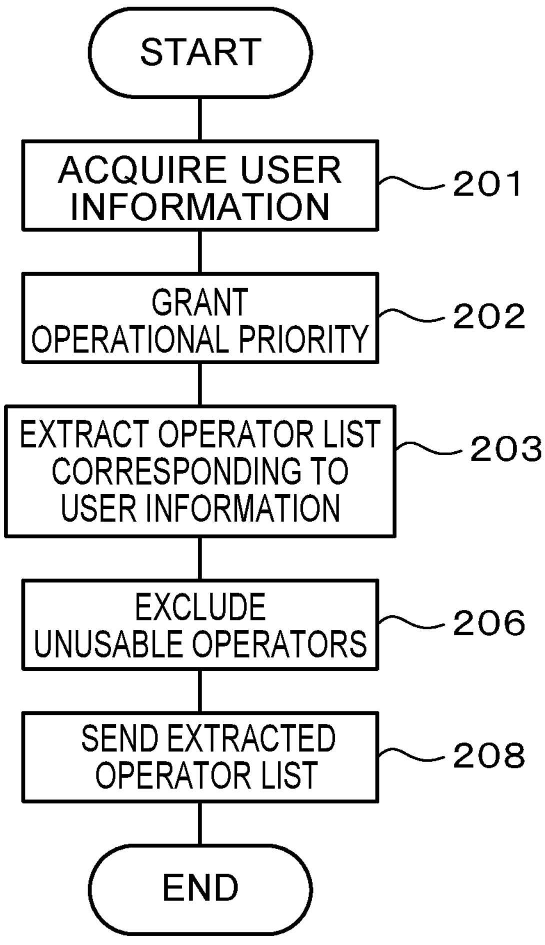
FIG. 12 is a flowchart showing an example of a flow of processes performed by the image forming apparatus when user information is sent from the mobile terminal device in the information processing system pertaining to the second embodiment.

Next, processes performed by the image forming apparatus 12 when the user information is sent from the mobile terminal device 14 will be described. FIG. 12 is a flowchart showing an example of a flow of processes performed by the image forming apparatus 12 when the user information is sent from the mobile terminal device 14 in the information processing system 10 pertaining to the present embodiment. It will be noted that the processes in FIG. 12 start when short-range wireless communication with the mobile terminal device 14 is established and the user information is sent from the mobile terminal device 14. Furthermore, processes identical to processes in FIG. 10 are assigned identical reference signs and described.

In step 201 the CPU 20A acquires the user information, then moves to step 202. In the present embodiment, the acquisition unit 58 acquires the user information sent from the sending unit 52 of the mobile terminal device 14.

In step 202 the CPU 20A grants operational priority to the mobile terminal device 14 with which short-range wireless communication has been established, then moves to step 203. For example, the CPU 20A locks the screen of the user interface 22 in order to prohibit use of the image forming apparatus 12 by another user. It will be noted that step 202 may also be omitted.

In step 203 the CPU 20A extracts the operator list corresponding to the user information, then moves to step 206. That is, the extraction unit 60 extracts, from among the operator lists prestored in the HDD 26, the operator list corresponding to the user information. Because of this, the extraction unit 60 extracts an operator list including only operators that the user corresponding to the user information has registered.

In step 206 the CPU 20A excludes unusable operators from the extracted operator list, then moves to step 208. For example, the extraction unit 60 excludes operators that cannot be used due, for example, to a difference in the settings of the image forming apparatus 12, a failure, or an access restriction having been changed. Because of this, only usable operators are extracted. It will be noted that step 206 may also be omitted.

In step 208 the CPU 20A sends the extracted operator list to the mobile terminal device 14, then ends the series of processes. That is, the sending unit 62 sends to the mobile terminal device 14 the operator list extracted by the extraction unit 60. Because of this, in the mobile terminal device 14, an operator list including only operators of the service to be used is displayed. Furthermore, because the CPU 20A extracts and sends the operators, the sending and receiving amount is decreased, and display and activation are faster. Furthermore, the process is hygienic because the job is executed without the user touching the user interface 22 and the like of the image forming apparatus 12 that a large number of unspecified people touch.

Third Embodiment

Next, an information processing system pertaining to a third embodiment will be described. The present embodiment is an embodiment in which the first embodiment and the second embodiment are combined. Consequently, basic configurations are identical to those of the first embodiment, so description of configurations will be omitted.

In the present embodiment, the acquisition unit 58 acquires, as the preset information, the user information together with the selection result of the service that the user will use. Then, when the extraction unit 60 extracts the operator list, the extraction unit 60 extracts an operator list corresponding to the user information and the service that the user will use.

Figure 13:
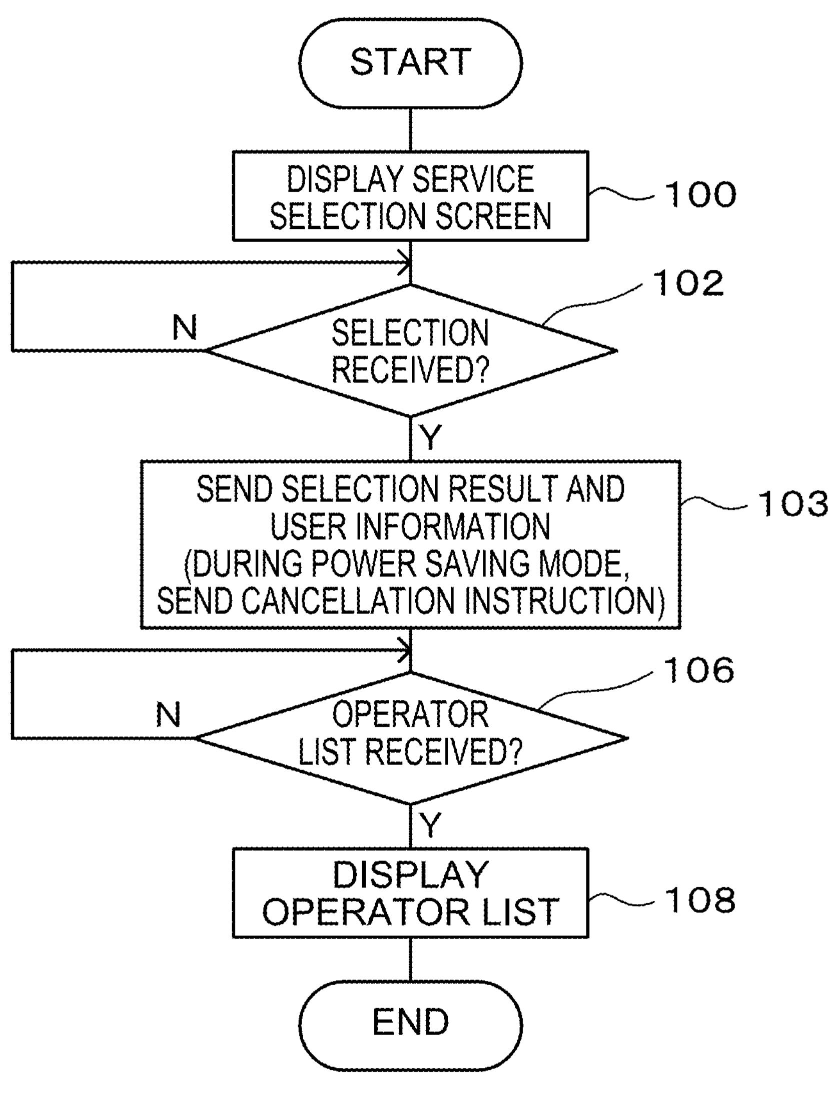
FIG. 13 is a flowchart showing an example of a flow of processes performed by the mobile terminal device when selecting an operator to execute a job in the information processing system pertaining to a third embodiment.

Here, specific processes performed by the mobile terminal device 14 when selecting an operator to execute a job in the information processing system 10 pertaining to the present embodiment will be described. FIG. 13 is a flowchart showing an example of a flow of processes performed by the mobile terminal device 14 when selecting an operator to execute a job in the information processing system 10 pertaining to the present embodiment. It will be noted that the processes in FIG. 13 start when the application is started. Furthermore, processes identical to processes in FIG. 9 are assigned identical reference signs and described.

In step 100 the CPU 14A displays a predetermined service selection screen on the display unit 14F, then moves to step 102. For example, as shown in FIG. 5, the CPU 14A displays a screen for selecting a service to use.

In step 102 the CPU 14A determines whether or not a service has been selected. The CPU 14A makes this determination by determining whether or not the selection reception unit 50 has received the selection of a service that the user will use. The CPU 14A stands by until the determination is YES, then moves to step 103. It will be noted that when a cancel operation or the like is performed while the CPU 14A is standing by, the CPU 14A ends the process and executes another instructed process.

In step 103 the CPU 14A sends the selection result and the user information to the image forming apparatus 12, then moves to step 106. That is, the sending unit 52 sends, by short-range wireless communication to the image forming apparatus 12, the user information together with the selection result received by the selection reception unit 50. It will be noted that, here, when the image forming apparatus 12 is in a power saving mode, the CPU 14A sends the selection result and the user information after causing the image forming apparatus 12 to exit the power saving mode by sending a power saving mode cancellation instruction such as a power saving mode cancellation command.

In step 106 the CPU 14A determines whether or not it has received the operator list from the image forming apparatus 12. The CPU 14A makes this determination by determining whether or not the receiving unit 56 has received the operator list extracted by the image forming apparatus 12 and sent by the sending unit 62. The CPU 14A stands by until the determination is YES, then moves to step 108. It will be noted that when a cancel operation or the like is performed while the CPU 14A is standing by, the CPU 14A ends the process and executes another instructed process.

In step 108 the CPU 14A displays on the display unit 14F the operator list received from the image forming apparatus 12, then ends the series of processes. That is, the output unit 54 outputs the operator list by displaying on the display unit 14F the operator list received by the receiving unit 56.

Figure 14:
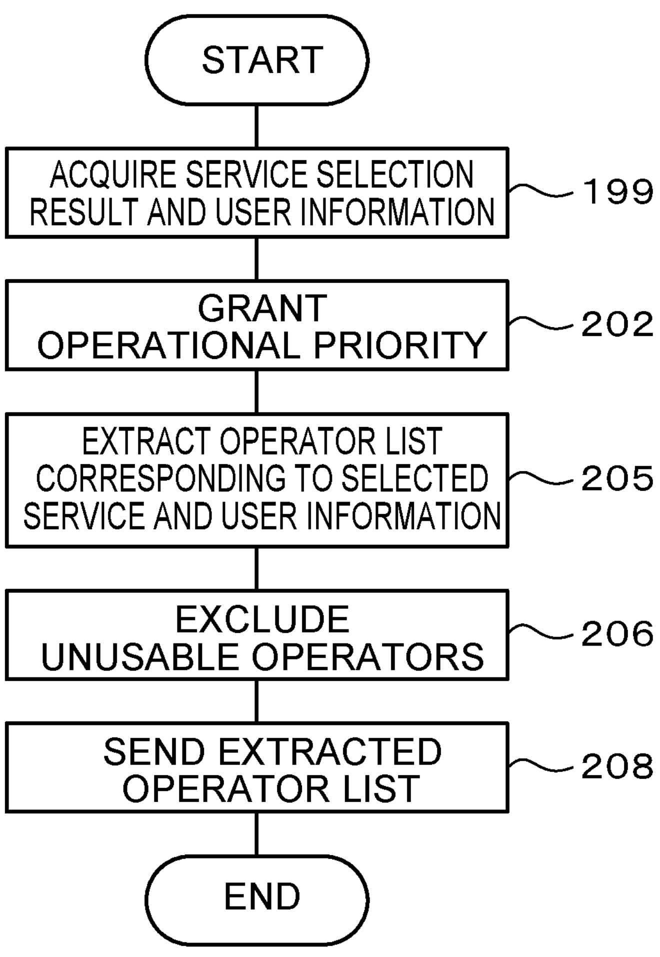
FIG. 14 is a flowchart showing an example of a flow of processes performed by the image forming apparatus when the service selection result and the user information are sent from the mobile terminal device in the information processing system pertaining to the third embodiment.

Next, processes performed by the image forming apparatus 12 when the service selection result and the user information are sent from the mobile terminal device 14 will be described. FIG. 14 is a flowchart showing an example of a flow of processes performed by the image forming apparatus 12 when the service selection result and the user information are sent from the mobile terminal device 14 in the information processing system 10 pertaining to the present embodiment. It will be noted that the processes in FIG. 14 start when short-range wireless communication with the mobile terminal device 14 is established and the service selection result and the user information are sent from the mobile terminal device 14. Furthermore, processes identical to processes in FIG. 10 are assigned identical reference signs and described.

In step 199 the CPU 20A acquires the service selection result and the user information, then moves to step 202. That is, the acquisition unit 58 acquires the selection result of the service that the user will use and the user information which were sent from the sending unit 52 of the mobile terminal device 14.

In step 202 the CPU 20A grants operational priority to the mobile terminal device 14 with which short-range wireless communication has been established, then moves to step 205. For example, the CPU 20A locks the screen of the user interface 22 in order to prohibit use of the image forming apparatus 12 by another user. It will be noted that step 202 may also be omitted.

In step 205 the CPU 20A extracts the operator list corresponding to the selected service and the user information, then moves to step 206. That is, the extraction unit 60 extracts, from among the operator lists prestored in the HDD 26, the operator list corresponding to the user information and the service that the user will use.

In step 206 the CPU 20A excludes unusable operators from the extracted operator list, then moves to step 208. For example, the extraction unit 60 excludes operators that cannot be used due, for example, to a difference in the settings of the image forming apparatus 12, a failure, or an access restriction having been changed. Because of this, only usable operators are extracted. It will be noted that step 206 may also be omitted.

In step 208 the CPU 20A sends the extracted operator list to the mobile terminal device 14, then ends the series of processes. That is, the sending unit 62 sends to the mobile terminal device 14 the operator list extracted by the extraction unit 60. Because of this, in the mobile terminal device 14, an operator list including only operators of the service to be used is displayed. Furthermore, because the CPU 20A extracts and sends the operators, the sending and receiving amount is decreased, and display and activation are faster. Furthermore, the process is hygienic because the job is executed without the user touching the user interface 22 and the like of the image forming apparatus 12 that a large number of unspecified people touch.

It will be noted that although in each of the above embodiments an example was described where the image forming apparatus 12 has the function of the extraction unit 60, the disclosure is not limited to this. For example, the mobile terminal device 14 may be provided with the functions of the acquisition unit 58 and the extraction unit 60, so that the image forming apparatus 12 sends all operator lists to the mobile terminal device 14, and the mobile terminal device 14 extracts the operators. In this case, the mobile terminal device 14 functions as the information processing apparatus, and the image forming apparatus 12 functions as an execution apparatus.

Furthermore, in each of the above embodiments an example was described where a job is executed by remote control of the image forming apparatus 12 from the mobile terminal device 14, but the disclosure is not limited to this. For example, the extraction of the operators may also be performed when the user interface 22 of the image forming apparatus 12 is operated to execute a job.

Furthermore, in the above embodiments, the CPU was described as an example of the processor, but "processor" refers to processors in a broad sense and includes general-purpose processors (e.g., CPUs) and dedicated processors (e.g., graphics processing units (GPUs), application-specific integrated circuits (ASICs), field-programmable gate arrays (FPGAs), and programmable logic devices).

Furthermore, the operations of the processor in the above embodiments may be performed by multiple processors in physically separate positions working together rather than being performed by only one processor. Furthermore, the order of the operations performed by the processor is not limited to the order described in each of the above embodiments and may be changed as appropriate.

Furthermore, the processes performed by the various parts of the information processing system 10 pertaining to the above embodiments may be processes performed by software, or processes performed by hardware, or processes combining both software and hardware. Furthermore, the processes performed by the various parts of the information processing system 10 may be stored as a program in storage media and circulated.

Furthermore, the present disclosure is not limited to the above and can of course be modified in various ways and implemented, in addition to what is described above, without departing from the spirit thereof.

The disclosure of Japanese Patent Application No. 2021-124757 is incorporated in its entirety herein by reference. Furthermore, all documents, patent applications, and technical standards mentioned in this specification are incorporated herein by reference to the same extent as if each individual document, patent application, or technical standard were specifically and individually indicated to be incorporated by reference.

The invention claimed is:

1. An information processing apparatus including a processor, the processor performing a process to:
- acquire preset information;
- extract an operator corresponding to the preset information from plural operators associated with settings of executed jobs;
- output the operator corresponding to the preset information;
- acquire the preset information from a terminal device with which it has established short-range wireless communication; and
- grant operational priority of a host device to the terminal device from which the preset information is acquired.

2. The information processing apparatus of claim 1, wherein the processor acquires, as the preset information, at least one of user information or a type of job that a user will use, and extracts and outputs the operator corresponding to the at least one.

3. An information processing system comprising:
- the information processing apparatus of claim 1; and
- a mobile terminal device that sends the information to the information processing apparatus and displays the operator that has been output from the information processing apparatus.

4. An information processing apparatus including a processor, the processor performing a process to:
- acquire preset information;
- extract an operator other than unusable operators corresponding to the preset information from plural operators associated with settings of executed jobs; and
- output the operator corresponding to the preset information,
- wherein, at a time of extracting the operator, the processor extracts the operator after excluding unusable operators.

5. The information processing apparatus of claim 4, wherein the unusable operators are operators corresponding to at least one of a failure or an access restriction.

6. An information processing apparatus including a processor, the processor performing a process to:
- acquire preset information;
- acquire plural operators registered in an execution apparatus that executes jobs;
- extract an operator corresponding to the preset information from plural operators associated with settings of executed jobs; and
- output the operator corresponding to the preset information.

7. The information processing apparatus of claim 6, wherein, in a case in which the execution apparatus is in a power saving mode, the processor acquires the plural operators registered in the execution apparatus after instructing cancellation of the power saving mode.

8. An information processing system comprising:
- the information processing apparatus of claim 6; and
- an execution apparatus that sends plural preregistered operators to the information processing apparatus.

9. A non-transitory computer-readable storage medium storing an information processing program executable by a computer to perform processing, the processing comprising:
- acquire preset information;
- extract an operator corresponding to the preset information from plural operators associated with settings of executed jobs;
- output the operator corresponding to the preset information;

acquire the preset information from a terminal device with which it has established short-range wireless communication; and grant operational priority of a host device to the terminal device from which the preset information is acquired.

* * * * *